United States Patent
Sugiura et al.

(10) Patent No.: US 9,725,886 B2
(45) Date of Patent: Aug. 8, 2017

(54) ABNORMALITY INFORMATION CONTROL DEVICE FOR CONSTRUCTION MACHINE

(71) Applicant: Hitachi Construction Machinery Co., Ltd., Tokyo (JP)

(72) Inventors: Manabu Sugiura, Utsunomiya (JP); Koichi Shibata, Kasumigaura (JP); Taiki Aizawa, Kasumigaura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 34 days.

(21) Appl. No.: 14/770,940

(22) PCT Filed: Jun. 20, 2014

(86) PCT No.: PCT/JP2014/066382
§ 371 (c)(1),
(2) Date: Aug. 27, 2015

(87) PCT Pub. No.: WO2014/203990
PCT Pub. Date: Dec. 24, 2014

(65) Prior Publication Data
US 2016/0010313 A1    Jan. 14, 2016

(30) Foreign Application Priority Data

Jun. 21, 2013 (JP) .................................. 2013-130788

(51) Int. Cl.
*E02F 9/26* (2006.01)
*B60R 16/023* (2006.01)
(Continued)

(52) U.S. Cl.
CPC .......... *E02F 9/268* (2013.01); *B60R 16/0234* (2013.01); *E02F 9/2025* (2013.01);
(Continued)

(58) Field of Classification Search
CPC . E02F 9/268; E02F 9/2025; E02F 9/24; E02F 9/2292; E02F 9/2296; G07C 5/0808;
(Continued)

(56) References Cited

U.S. PATENT DOCUMENTS 6,148,258 A * 11/2000 Boisvert ............... F02P 19/022
123/145 A
8,417,412 B2 * 4/2013 Tominaga .............. G07C 5/008
701/31.4
(Continued)

FOREIGN PATENT DOCUMENTS

CN          101981593 A    2/2011
JP          9-178246 A     7/1997
(Continued)

OTHER PUBLICATIONS

Japanese Office Action received in corresponding Japanese Application No. 2015-522989 dated May 24, 2016.
International Search Report of PCT/JP2014/066382.

*Primary Examiner* — Jason Holloway
(74) *Attorney, Agent, or Firm* — Mattingly & Malur, PC (57) ABSTRACT

An abnormality control device for a construction machine includes: an abnormality detection means for detecting abnormality of an apparatus installed on the construction machine; an abnormality information output means for outputting abnormality information about the apparatus detected by the abnormality detection means in an ordinary mode, and negating or avoiding outputting the abnormality information about the apparatus detected by the abnormality detection means in a maintenance mode; and a mode switch means for determining a content of maintenance work and switching a work mode between an ordinary mode and a work mode according to the content of work or a situation.

4 Claims, 10 Drawing Sheets

(51) Int. Cl.
| | | |
|---|---|---|
| *E02F 9/22* | (2006.01) | |
| *E02F 9/20* | (2006.01) | |
| *E02F 9/24* | (2006.01) | |
| *G07C 5/00* | (2006.01) | |
| *G07C 5/08* | (2006.01) | |

(52) U.S. Cl.
CPC .......... *E02F 9/2292* (2013.01); *E02F 9/2296* (2013.01); *E02F 9/24* (2013.01); *G07C 5/006* (2013.01); *G07C 5/0808* (2013.01)

(58) Field of Classification Search
CPC  G07C 5/006; G07C 2205/02; B60R 16/0234; G05B 23/0283; G05B 23/0264
See application file for complete search history.

(56) References Cited

U.S. PATENT DOCUMENTS

| | | | |
|---|---|---|---|
| 2004/0093136 A1 | 5/2004 | Hanamata | |
| 2007/0126559 A1* | 6/2007 | Adachi | B60R 25/102 340/425.5 |
| 2009/0066494 A1* | 3/2009 | Ishikawa | G01S 7/529 340/438 |
| 2009/0265064 A1* | 10/2009 | Furuno | G06Q 10/00 701/50 |
| 2010/0324777 A1* | 12/2010 | Tominaga | G07C 5/0808 701/31.4 |
| 2012/0317444 A1* | 12/2012 | Suzuki | E02F 9/2025 714/39 |
| 2016/0002892 A1* | 1/2016 | Aizawa | E02F 9/2292 701/99 |
| 2016/0169771 A1* | 6/2016 | Hiruta | G05B 23/0243 702/183 |
| 2017/0002549 A1* | 1/2017 | You | E02F 9/267 |

FOREIGN PATENT DOCUMENTS

| | | |
|---|---|---|
| JP | 9-210864 A | 8/1997 |
| JP | 2004-69643 A | 3/2004 |
| JP | 2005-041438 A | 2/2005 |
| JP | 2005/58175 A | 3/2005 |
| JP | 2009-067135 A | 4/2009 |
| JP | 2009-227194 A | 10/2009 |
| JP | 2010/282318 A | 12/2010 |
| JP | 4769382 B2 | 6/2011 |
| JP | 2011-169838 A | 9/2011 |
| WO | 2007/080835 A1 | 7/2007 |

* cited by examiner

ABNORMALITY INFORMATION CONTROL DEVICE FOR CONSTRUCTION MACHINE

TECHNICAL FIELD

The present invention relates to a construction machine such as a hydraulic excavator, in particular to an abnormality information control device for a construction machine that treats abnormality information differently whether a vehicle body of the construction machine is in an ordinary mode or in a maintenance mode.

BACKGROUND ART

In the field of construction machines such as hydraulic excavators, wheeled loaders, dump trucks and bulldozers, electronic control of the engine and electroactuation/hybridization of the vehicle body have been promoted to decrease loads on environment or to cope with escalating resource prices. As a result, the construction machines now include many sensors represented by pressure sensors attached to them to achieve complicated controls.

The construction machines include dedicated controllers (control devices) for their respective functions such as controlling engines and hydraulic actuators, managing the operation states of the vehicle bodies and so on. Some of the controllers have a failure determination function to determine whether a predetermined control or controls are performed regularly or whether any abnormality of the sensor or sensors such as disconnection (breakage of wire) occurs.

Controllers having a failure determination function record the determined failures that are classified in the form of error codes depending on the content of the failure determined by this function. The controller itself, which stores the results of failure determination, is configured to periodically transmit information such as the error code or time of occurrence of failure to an information center via a wireless communication terminal. According to an established system, a service person of the manufacturer of the construction machine analyses the cause of failure of the vehicle body based on the various pieces of information collected at the information center. If the service person judges that some urgent repair is necessary, he holds in reserve necessary machinery and materials and goes off to the site to be able to quickly cope with the failure.

The content of the error codes collected at the information center in this manner does not always correspond to actual situation of the vehicle body. For instance, if the service person temporarily dismounts a part such as a sensor during maintenance work such as replacement of a part of the vehicle body and a failure diagnosis is performed in this state, the controller makes a decision that the sensor is disconnected and transmits an error code.

The service person who performs the work knows that this error code is a meaningless, false error code that is generated at the time of replacing the parts. However, other service persons cannot determine whether the error code concerned is true or false, so that they cannot properly cope with it. In addition, it is possible that this false error code will continue to be managed as a failure history and thus time may be consumed for the analysis of this meaningless false error code.

To solve such a problem, a controller is conventionally proposed as described in, for instance, PTL 1 below. This controller is configured such that when a service person connects a failure diagnosis device, which is able to collect abnormality information data, to the vehicle body at a service factory where maintenance work is often performed, the controller does not output to the outside any abnormality information detected. PTL 2 discloses a method of transmitting to the administrator only those error codes that satisfy a unified standard for error codes.

CITATION LIST

Patent Literature

PTL 1: JP 2005-41438 A
PTL 2: JP 4769382 B

SUMMARY OF INVENTION

Technical Problem

However, although the controller as disclosed in PTL 1 disables the transmission of abnormality information to the information center, it requires that the failure diagnosis device has to be connected to the vehicle body any time when the maintenance work is performed. On the other hand, the method as disclosed in PTL 2 has a problem that it is impossible to push for weaker safety standard for an adverse influence to the control of the vehicle body, such as failure or disconnection of the sensor.

The present invention is to solve these problems and has for its object to provide a novel information control device for a construction machine that is provided with a maintenance mode in which any abnormality information that is detected is not output and that allows transition between a maintenance mode and an ordinary mode.

Solution to Problem

In order to solve the problem, an abnormality control device for a construction machine according to the 1st invention comprises: an abnormality detection means for detecting abnormality of an apparatus installed on the construction machine; an abnormality information output means for outputting abnormality information about the apparatus detected by the abnormality detection means in an ordinary mode, and negating or avoiding outputting the abnormality information about the apparatus detected by the abnormality detection means in a maintenance mode; and a mode switch means for determining a content of maintenance work and switching a work mode between an ordinary mode and a work mode according to the content of work or a situation.

This configuration allows automatic switching between a maintenance mode and an ordinary mode from one to another depending on the content of the maintenance work or on the situation. This avoids outputting meaningless false abnormality information that is generated during the maintenance mode and allows outputting only true abnormality information that is generated in the ordinary mode. In addition, this enables avoiding human mistakes such as human carelessness in switching or forgetting switching the work mode to the ordinary mode after the maintenance work.

The term "maintenance mode" as used herein refers to a state in which abnormality information (error code), which arises with work such as inspection or maintenance of various devices and apparatuses installed on a construction machine as exemplified later, is negated or not output. On the other hand, the term "ordinary mode" refers to a state in which all the pieces of abnormality information detected are stored and the stored abnormality information can be transmitted to, for example, a remote information center at predetermined timing by a predetermined method.

According to the 2nd invention, the abnormality control device for a construction machine according to the 1st invention further comprises: a connection means for connecting a service apparatus that performs maintenance work to a vehicle body; wherein the mode switch means switches the work mode between the ordinary mode and the maintenance mode according to the content of maintenance work or the situation selected at the service apparatus. This configuration enables automatically switching the maintenance mode and the ordinary mode one from another if only the service person connects a service apparatus to the vehicle body and selects the content of the maintenance work.

According to the 3rd invention, in the abnormality control device for a construction machine according to the 2nd invention, the mode switch means switches the work mode to the ordinary mode if the content of maintenance work or the situation selected at the service apparatus is to be performed in a state in which an engine is started up, or switches the work mode to the maintenance mode if the content of maintenance work or the situation selected at the service apparatus is to be performed in a state in which the engine is stopped. This configuration enables separating the contents of the maintenance work into work in an ordinary mode and work in a maintenance mode clearly depending on whether the engine is started up.

According to the 4th invention, in the abnormality control device for a construction machine according to the 2nd or 3rd invention, the mode switch means switches the work mode to the ordinary mode when the maintenance work performed in the maintenance mode is completed. This configuration enables eliminating human mistakes such as forgetting switching the work mode from the maintenance mode to the ordinary mode after completion of the work.

According to the 5th invention, in the abnormality control device for a construction machine according to the 2nd or 3rd invention, the mode switch means switches the work mode to the ordinary mode when the service apparatus is disconnected. This configuration enables eliminating human mistakes such as forgetting switching the work mode from the maintenance mode to the ordinary mode after the work in the same manner as that in the fourth invention.

Advantageous Effects of Invention

According to the present invention, the ordinary mode and the maintenance mode are automatically switched one from another depending on the content of the maintenance work and the situation. This avoids outputting meaningless false abnormality information generated during the maintenance mode and allows outputting only true abnormality information generated during the maintenance work. This also avoids human mistakes such as erroneous switching or forgetting switching the work mode to the ordinary mode after the maintenance work.

DESCRIPTION OF EMBODIMENTS

Figure 1:
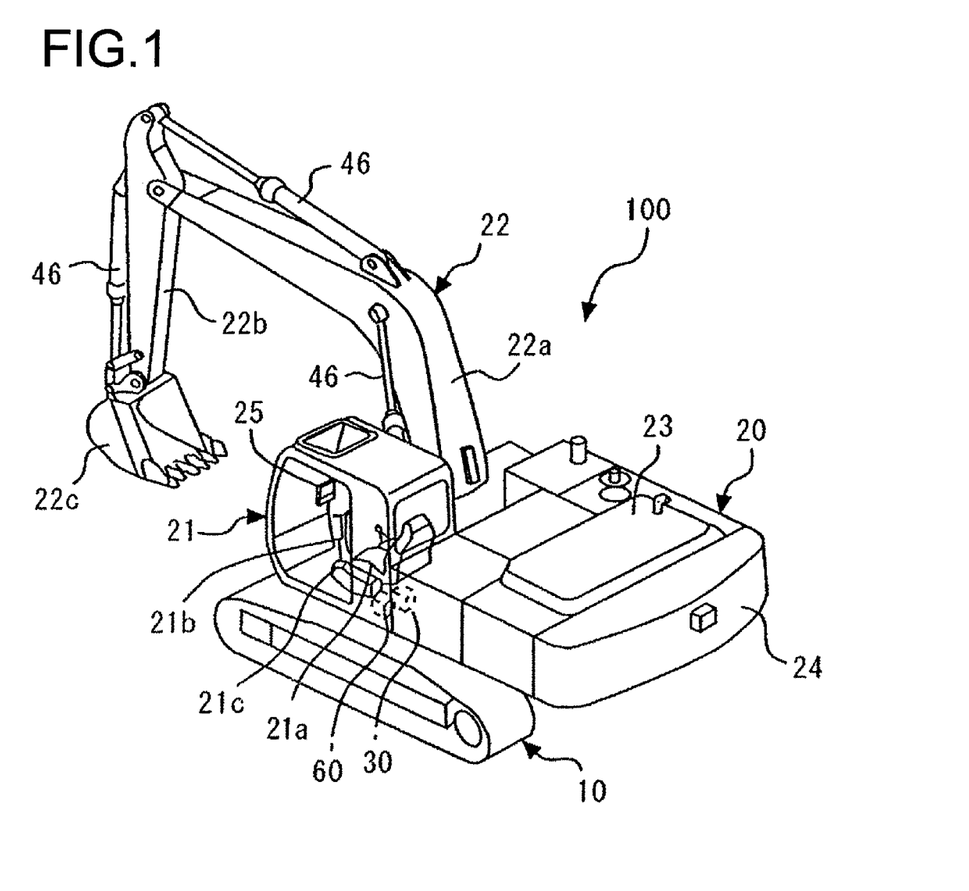
FIG. 1 is a perspective view showing an embodiment of a hydraulic excavator 100, one of the construction machines according to the present invention.

Now, an embodiment of the present invention is explained with reference to the attached drawings. FIG. 1 shows an embodiment of a hydraulic excavator 100, which is one of the construction machines according to the present invention. As shown in FIG. 1, the hydraulic excavator 100 includes as main components an undercarriage 10 that travels with a crawler and an upper structure 20 provided swingably on the undercarriage 10. The upper structure 20 includes a cab 21 having a driver seat 21a and a front operation machine 22 on the front side of an upper structure frame (not shown) and on the back side an engine room 23 accommodating an engine, a heat exchanger (not shown) and so on and on the further back side of these a weight 24, etc.

The front operation machine 22 includes a boom 22a, an arm 22b, bucket 22c and hydraulic cylinders 46, 46, 46 and so on. These parts are operated by operating operation levers 21b provided on both sides of the driver seat 21a in the cab 21 to slide the respective hydraulic cylinders 46, 46, 46. In the configuration shown in FIG. 1, the bucket 22c is attached to a leading end of the arm 22b. However, instead of the bucket 22c, various attachments such as a grabbler may be attached. The movement mechanism of the undercarriage 10 may use tires instead of the crawler.

In front of the driver seat 21a is provided a monitor device 25 provided with a liquid crystal display unit, which is able to display various types of information described later. Near the operation lever 21b on the left side of the driver seat 21a is provided a gate lock lever 21c. When the gate lock lever 21c is held up, a locked state is set. In this state, if the operation lever 21b is tilted while the engine is being started up, the vehicle body will not move and tilting down of the gate lock lever 21c allows the vehicle body to move.

Figure 2:
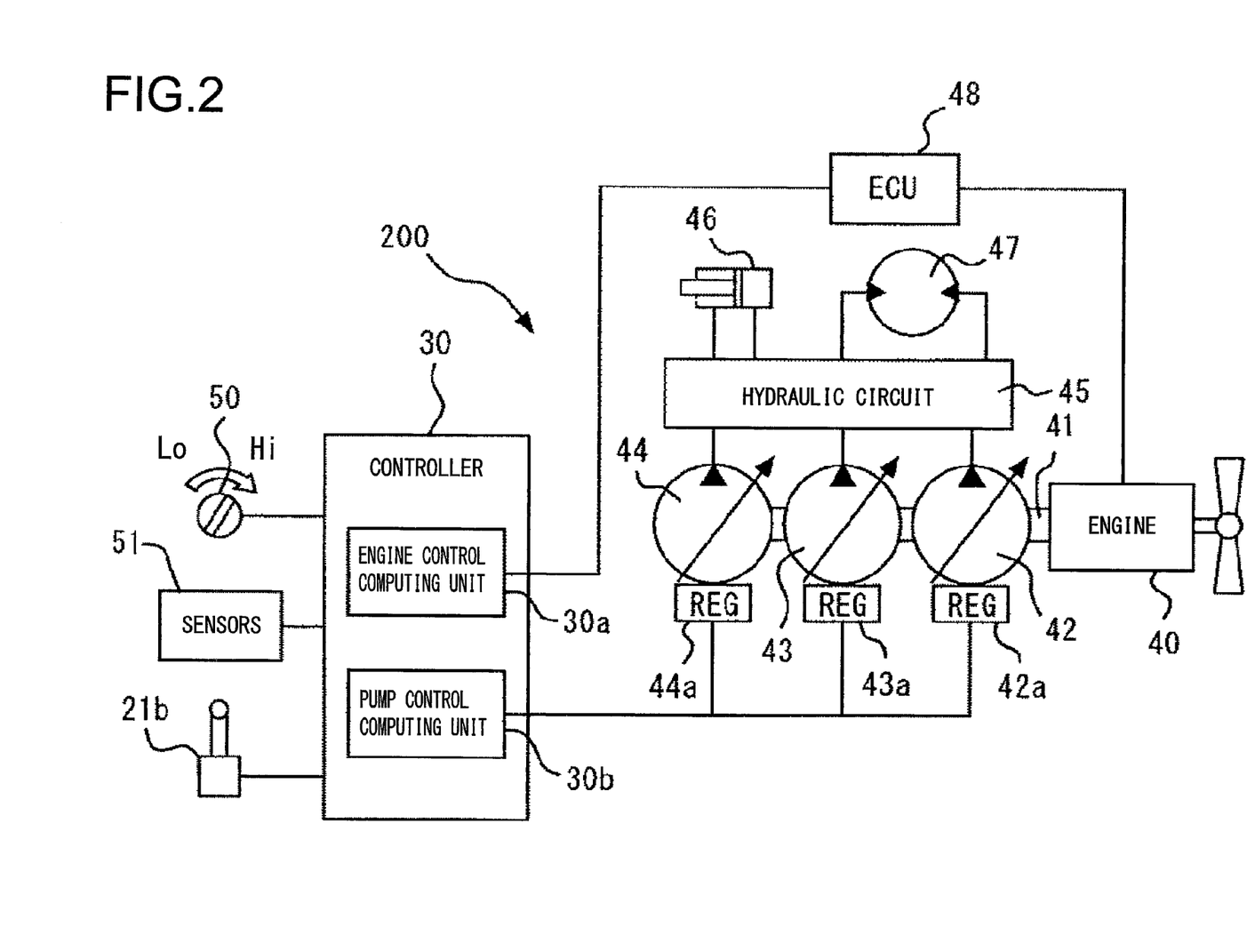
FIG. 2 is an overall view showing a hydraulic system 200 controlled by a controller 30.

At the back of the driver seat 21a, for instance, various types of control devices such as a controller 30 and an information controller 60 and so on are accommodated. The controller 30 controls overall the hydraulic system 200 as shown in FIG. 2. In FIG. 2, reference numeral 40 denotes an engine having an output axle 41, to which are connected a first hydraulic pump 42, a second hydraulic pump 43, and a third hydraulic pump 44, which are variable displacement pumps. Pressure oil delivered from each of the hydraulic pumps 42, 43, 44 is sent to a hydraulic circuit 45 that includes a control valve and is controlled for its quantity and flow direction and supplied to, for instance, a hydraulic cylinder 46 and a hydraulic motor 47.

The controller 30 receives signals that are input from an engine control dial 50, various types of sensors 51, and the operation lever 21b and so on and integrally controls an engine control computing unit 30a and a pump control computing unit 30b based on the input signals.

That is, the engine control dial 50 is able to adjust a command value of rotation speed. The command rotation speed adjusted by the engine control dial 50 is input to the engine control computing unit 30a. The engine control computing unit 30a calculates a target engine rotation speed based on the value input to it and sends the calculated target engine rotation speed to ECU 48 that is an engine control unit. The ECU 48 controls the rotation speed of the engine based on the target engine rotation speed.

On the other hand, a signal from the sensor 51 that detects pump pressure, etc. and an operation signal from the operation lever 21b are input into the engine control computing unit 30a and the pump control computing unit 30b. The pump control computing unit 30b calculates command values based on the input values and controls the hydraulic pumps 42, 34, 44 to be driven based on the calculated command values. Specifically, the pump control computing unit 30b is configured to send pump torque pressure necessary for pump regulators 42a, 43a, 44a that regulate pump deliveries so that pumping rates in correspondence to the operation amount of the operation lever 21b can be obtained.

Figure 3:
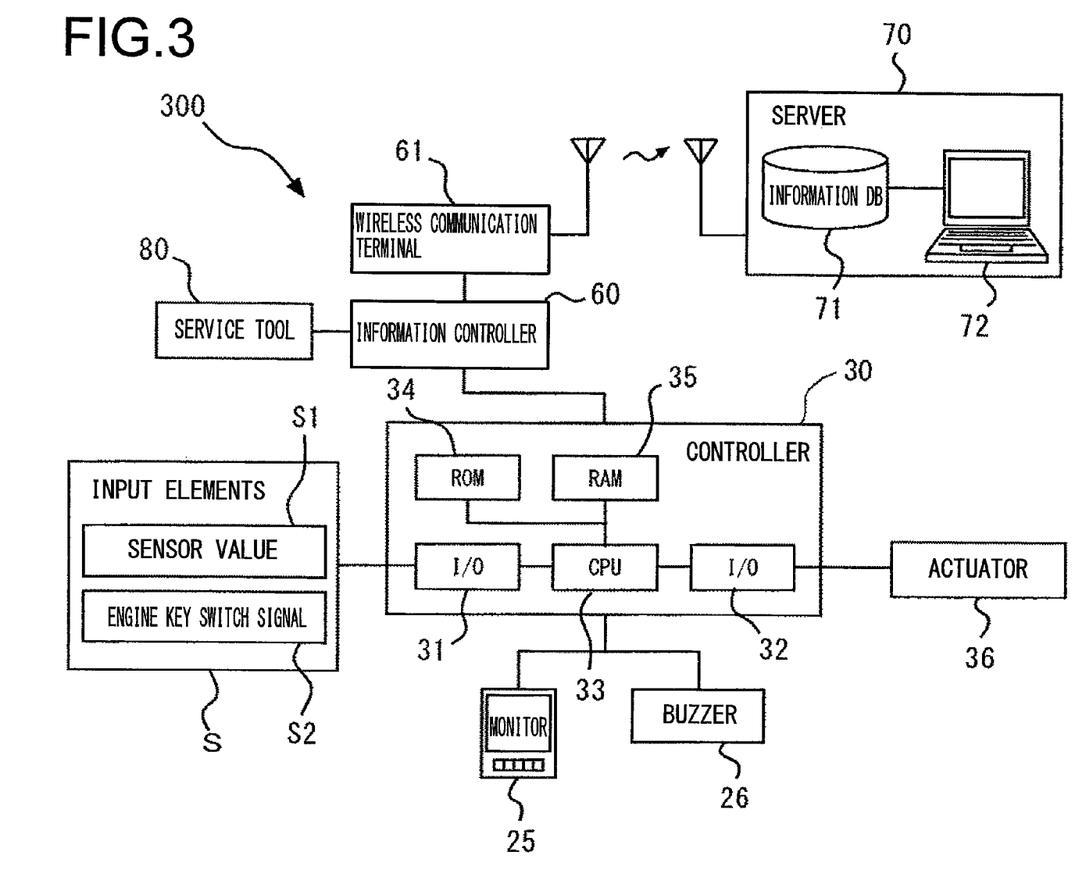
FIG. 3 is a block diagram showing the arrangement of an abnormality information control device 300 of the present invention.

FIG. 3 is a block diagram showing the arrangement of a maintenance device 300 according to the present invention, focusing on the controller 30. As shown in FIG. 3, the maintenance device 300 includes the controller 30, the information controller 60, and a wireless communication terminal 61 and so on. The controller 30 is constituted by an information processing device including hardware such as input/output interfaces 31, 32, a CPU 33, a ROM 34, and a RAM 35.

To the input/output interface 31 of the controller 30 are input elements S such as a sensor signal S1 and an engine key switch signal S2 and predetermined computing processing is performed at the CPU 33 based on the input elements S. The calculated output signal as command signals are output from the input/output interface 32 to hydraulic pumps 42 to 44 and actuator 36 such as a hydraulic cylinder 46. A control program used to cause predetermined computing processing to be executed at the CPU 33 is stored at the ROM 34. It is loaded at the RAM 35 when the engine key switch signal S2 is input and sequentially executes various controls described later.

Figure 4:
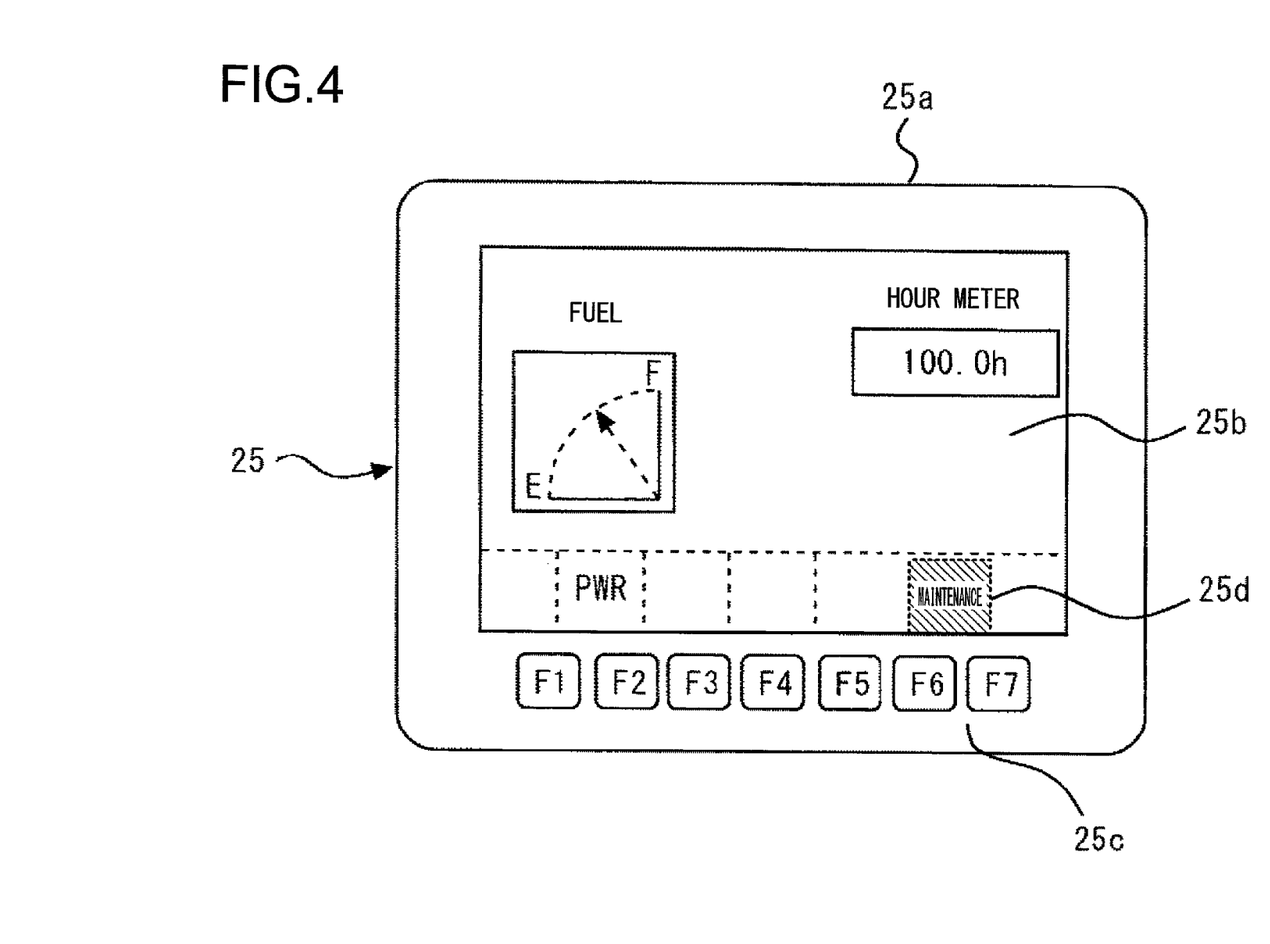
FIG. 4 is a front view showing an example of a monitor device 25.

The controller 30 has an abnormality detection function (abnormality detection program) that detects abnormality (error) of various devices and apparatuses installed on the vehicle based on signals input from them. If the controller 30 determines that abnormality is detected, it causes it to be brought on display on the monitor device 25 in front of the driver seat 21a. FIG. 4 shows an example of the monitor device 25. The monitor 25 has a monitor body 25a in a rectangular shape and a liquid crystal display unit 25b on the front surface of the monitor body 25a and an input unit 25c constituted by a plurality of input switches on the lower part of the monitor body 25.

After turning the engine key switch on as described later, the vehicle body is switched over to a maintenance mode as described later, and the switch over of the vehicle body to a maintenance mode is brought up on display, for instance by lighting up an icon 25d at the liquid crystal display unit 25b.

The operator can visually grasp what abnormality occurs to the vehicle body on the driver seat 21a by acknowledging the abnormality information that is brought up on display at the monitor device 25. The controller 30 is configured to perform not only processing for bringing up an alarm on display at the monitor device 25 but also processing for issuing audible alarm if the abnormality is serious, for instance, by activating a buzzer device 26 to issue a warning buzzer sound to notify the operator and the like of occurrence of an emergency without fail.

As shown in FIG. 3, this abnormality information is simultaneously stored at the information controller 60, which transmits the stored abnormality information as needed or periodically to a server 70 via the wireless communication device 61. The server 70 in receipt of this signal stores the received abnormality information at an abnormality information database 71. This allows a terminal 72 at each business site or factory to confirm the abnormality information by accessing to the server 70.

The information controller 60 is configured so that a service tool (service apparatus) 80 is detachably connected to the controller. Connection of the service tool 80 to the information controller 60 enables the operation state of the vehicle body and abnormality information and so on stored at the information controller 60 to be acquired as necessary. The service tool 80, which may be, for instance, a dedicated device for creating a daily report or a PC having installed software (program) for creating a daily report, is distributed to each service person for his use.

Figure 5:
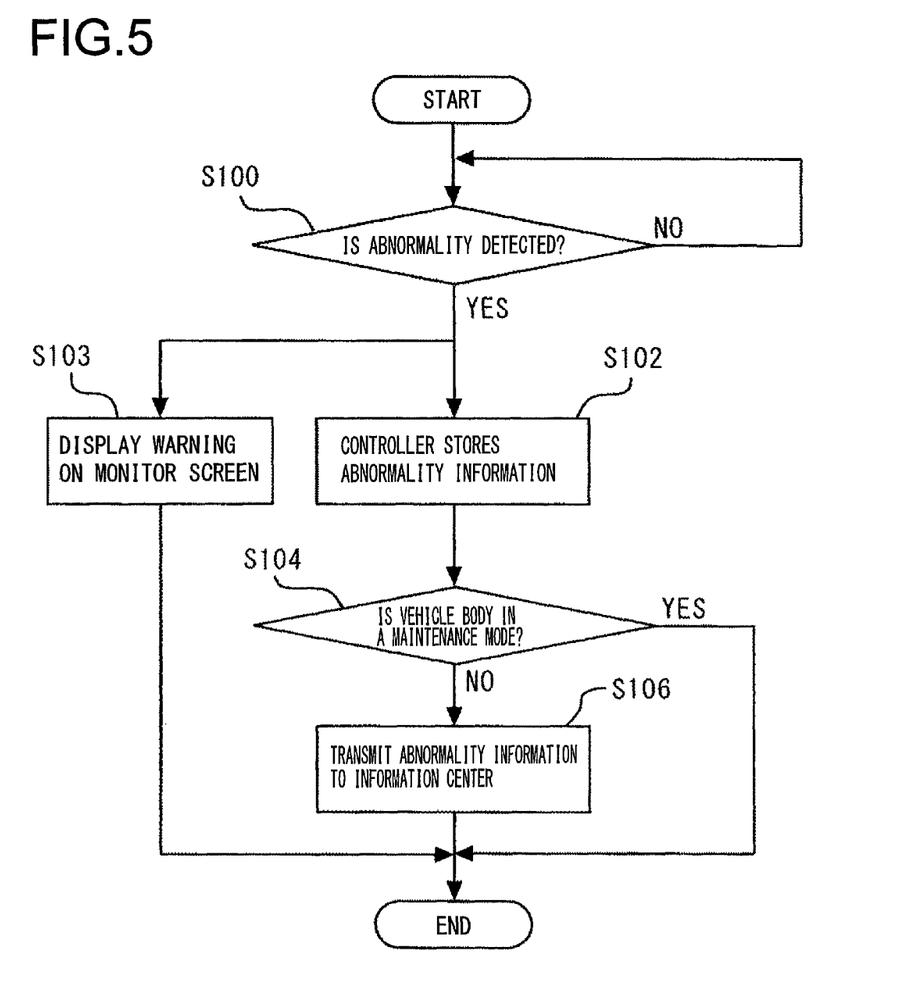
FIG. 5 is a flowchart illustrating the flow of processing of abnormality information by the abnormality information control device 300 of the present invention.

FIG. 5 is a flowchart illustrating the flow of processing abnormality information by an abnormality information control device 300 according to the present invention having the above-mentioned arrangement. As shown in FIG. 5, the abnormality information control device 300 determines whether abnormality is detected based on input signals from input elements S such as various types of sensors in a first step S100. If it determines that abnormality is detected (YES), it causes the operation to proceed to next steps S102 and S103. The detection of abnormality is done as follows. If, for instance, disconnection or short circuit occurs between sensor signals, then the voltage value of a sensor signal that is input to the controller 30 exceeds a certain threshold value. The controller 30 detects sensor high voltage abnormality if the input sensor signal has a voltage value that exceeds an upper limit threshold value. On the contrary, it detects sensor low voltage abnormality if the input sensor signal has a voltage value that is below a lower limit threshold value.

In step S102, the information controller 60 stores the abnormality information and causes the operation to proceed to next step S104. In step S103, the controller 60 causes a warning for the abnormality to be brought up on display at the liquid crystal display unit 25b of the monitor device 25.

In step S104, when the abnormality is detected, the information controller 60 determines whether the vehicle body is in a maintenance mode. If it determines that the vehicle body is in a maintenance mode (YES), it negates the abnormality information and causes the processing to end without outputting the abnormality information. On the other hand, if it determines that the vehicle body is not in a maintenance mode (NO), that is, the vehicle body is in an ordinary mode, it causes the operation to proceed to next step S106 to execute transmission of the error code of the stored abnormality information from the wireless communication device 61 to the server 70 after a predetermined time is elapsed.

According to the present invention, a state in which abnormality is detected according to the flow shown in FIG. 5 (step S100), the abnormality information is stored (step S102), and information such as an error code is transmitted to the information center as it is (step S106) is defined to be an ordinary mode. In contrast, a mode in which the function to transmit the abnormality information stored in step S102 to the information center in step 106 is negated is defined to be a maintenance mode.

Consequently, also in the maintenance mode, the function of detecting abnormality and storing abnormality information is active and thus it is possible to identify what abnormality is currently occurring at the monitor device 25 or the dedicated service tool 80. However, the controller neither stores abnormality information nor transmits error codes to the information center. In the maintenance mode as shown in FIG. 4, the information controller causes an icon 25d representing the maintenance mode to be brought up on display at the monitor device 25 and if the vehicle body is to be moved, it causes the engine control computing unit 30a to fix a minimal engine rotation speed at all times and output this to the ECU 48, with disregarding the command rotation speed adjusted via the engine control dial 50. This enables the service person to immediately know that the vehicle body is in a maintenance mode.

According to the present invention, the switching from the ordinary mode to the maintenance mode is naturally (automatically) performed in a series of flows of processing. That is, routinely, the service person is supposed to create a daily report after he performed maintenance work and manage the content of the work. The present invention is configured to enable switching the mode to occur spontaneously during the work of creating the daily report by the service person.

Figure 6:
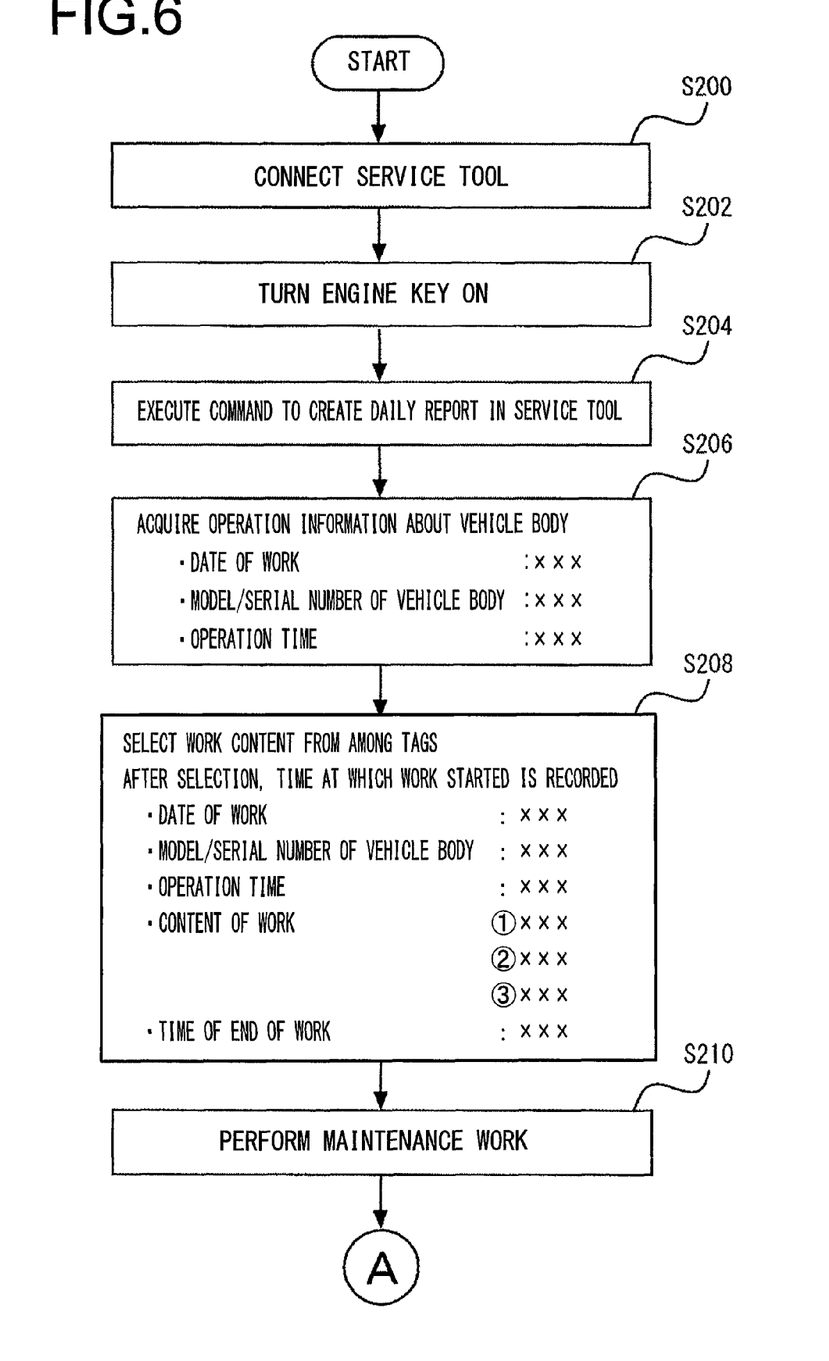
FIG. 6 is a flowchart illustrating an outline of a typical procedure for creating a daily report.
Figure 7:
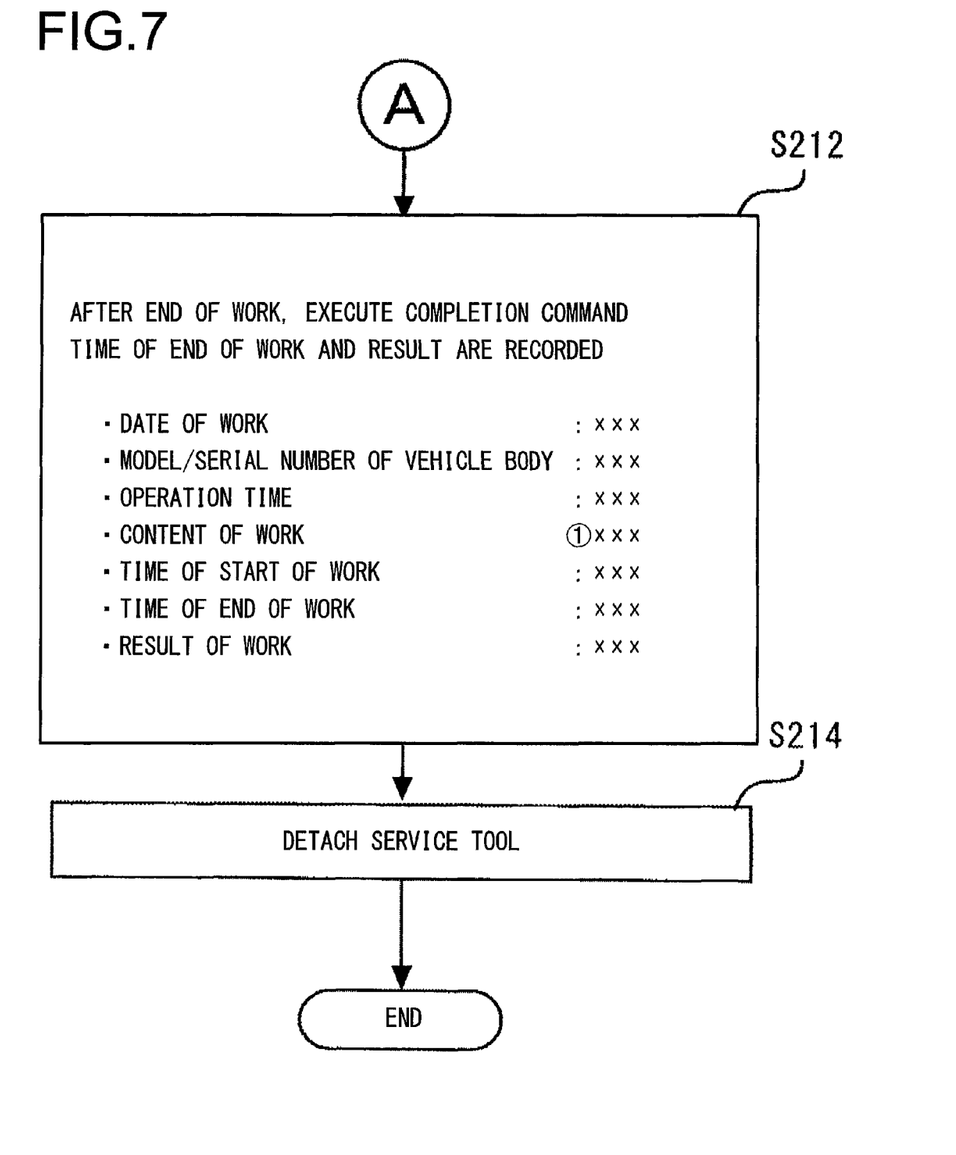
FIG. 7 is a flowchart illustrating an outline of a typical procedure for creating a daily report.

FIGS. 6 and 7 illustrate a typical procedure of creating a daily report. To create a daily report, a service person first connects a dedicated service tool 80 to the vehicle body (information controller 60) (step S200) and then turns the engine key switch on (step S202). By turning the engine key switch from off to on, power from the batteries is supplied through a power-supply line to each controller to activate it. This brings the vehicle body into an engine start standby state.

When the engine key switch of the vehicle body is turned on, a command to create a daily report in the service tool 80 is executed to start preparation for creating a daily report (step S204). When creation of a daily report is started, first basic information necessary for creating the daily report, such as model and serial number of the vehicle and operation time, are acquired from the information controller 60 via the service tool 80 (step S206). Then, the service person selects the content of work he is going to perform from among items separated with tags (step S208). The contents of work, details of which are described later, are classified depending on the contents, such as, for instance, rewriting control program (software), and replacement of parts. After the selection of the content of work, time of work is recorded. Thereafter, the service person performs the selected maintenance work (step S210).

After the maintenance work is completed, an end command is executed (step S212). As a result, time of work is recorded and creation of the daily report is completed. The created daily report is stored as electronic data under a file name and is output on paper later for management. After the creation of the daily report is completed, the service person detaches the service tool 80 from the vehicle body to end the process (step S214).

Throughout the continuum of daily report creation procedure, the controller 30 according to the present invention causes a command to switch the work mode from the ordinary mode to the maintenance mode to be transmitted from the service tool 80 to the information controller 60 at a stage in which the content of work is selected in step S208. This allows the state of the vehicle to automatically switch from the ordinary mode to the maintenance mode. In addition, the present invention is configured to cause the timing at which the state of the vehicle body returns from the maintenance mode to the ordinary mode to be changed according to the selected content of work. In the present invention, the contents of work are classified into three categories, i.e., "TEST DRIVE", "REWRITE SOFTWARE", and "REPLACE PARTS and explanation is made below as to how the procedure is changed according to the respective contents of work is explained below.

Test Drive

Figure 8:
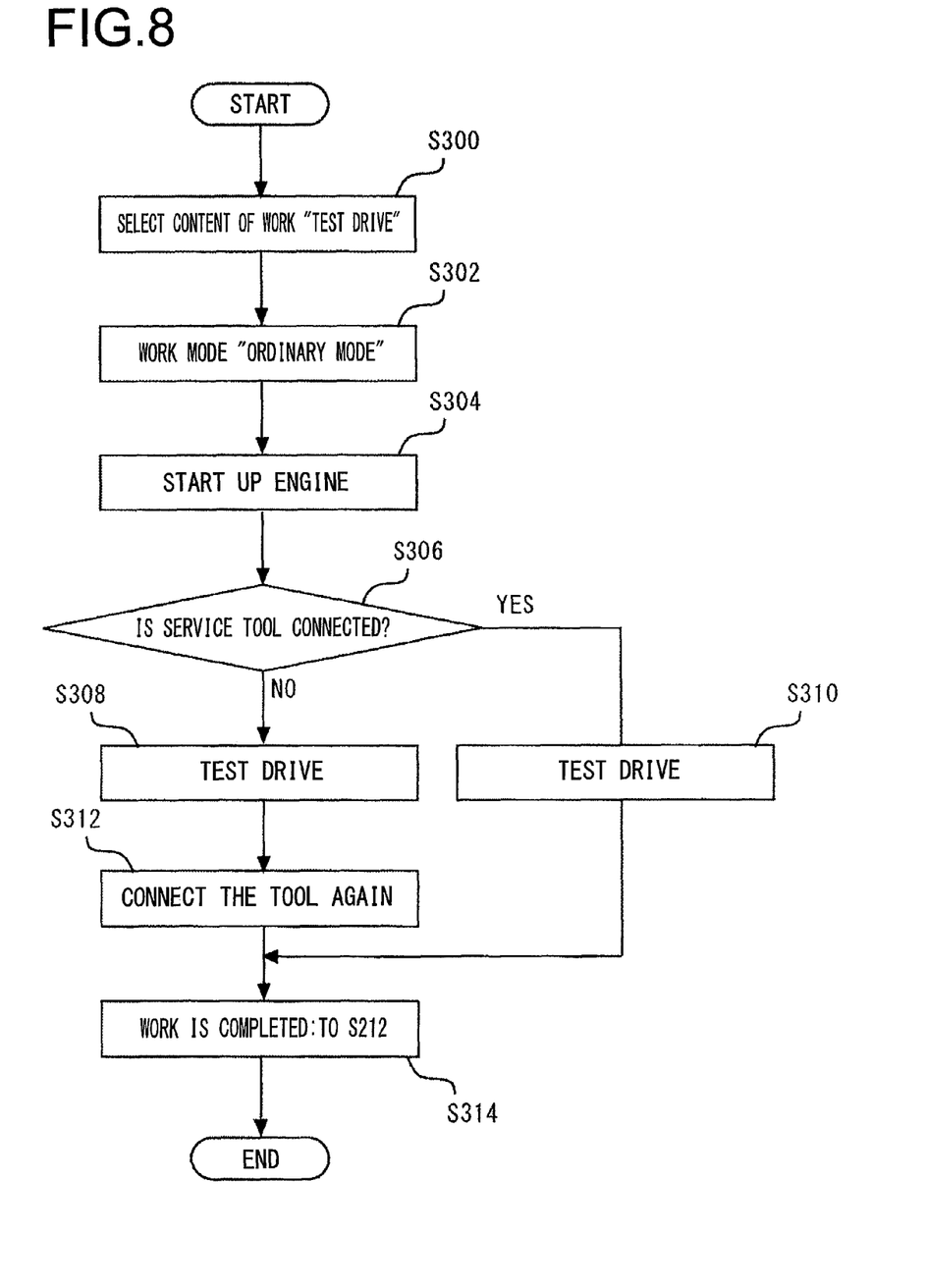
FIG. 8 is a flowchart illustrating the flow of processing in case "TEST DRIVE" is selected as the content of the work.

FIG. 8 illustrates the flow of processing in case "TEST DRIVE" is selected as the content of work. The term "TEST DRIVE" as used herein refers to making an inspection to see if any problem arises in the operation of the vehicle body by actually starting up the engine to operate each unit of the vehicle body. First, in case "TEST DRIVE" is selected as the content of work (step S300), the work is basically only to move the vehicle body, and the vehicle body is held in an ordinary mode (step S302). To move the vehicle body, the service person further turns the engine start up key from the engine key on state to actually start up the engine (step S304).

When the engine starts up, the service person immediately performs test drive. If the service tool 80 hinders the operation of the vehicle body, the service tool 80 connected is temporarily detached as indicated in step S306. When the test drive in a state in which the service tool 80 is connected (step S310) ends, the work is immediately terminated (step S314). On the other hand, in case the test drive is performed in a state in which the service tool 80 is disconnected (step S308), the daily report information which is being created is temporarily stored in a memory area in the service tool 80. After the test drive ends, the service person connects the service tool 80 again (step S312) to read out the daily report information which is being created and end the work (step S314).

Rewrite Software

Figure 9:
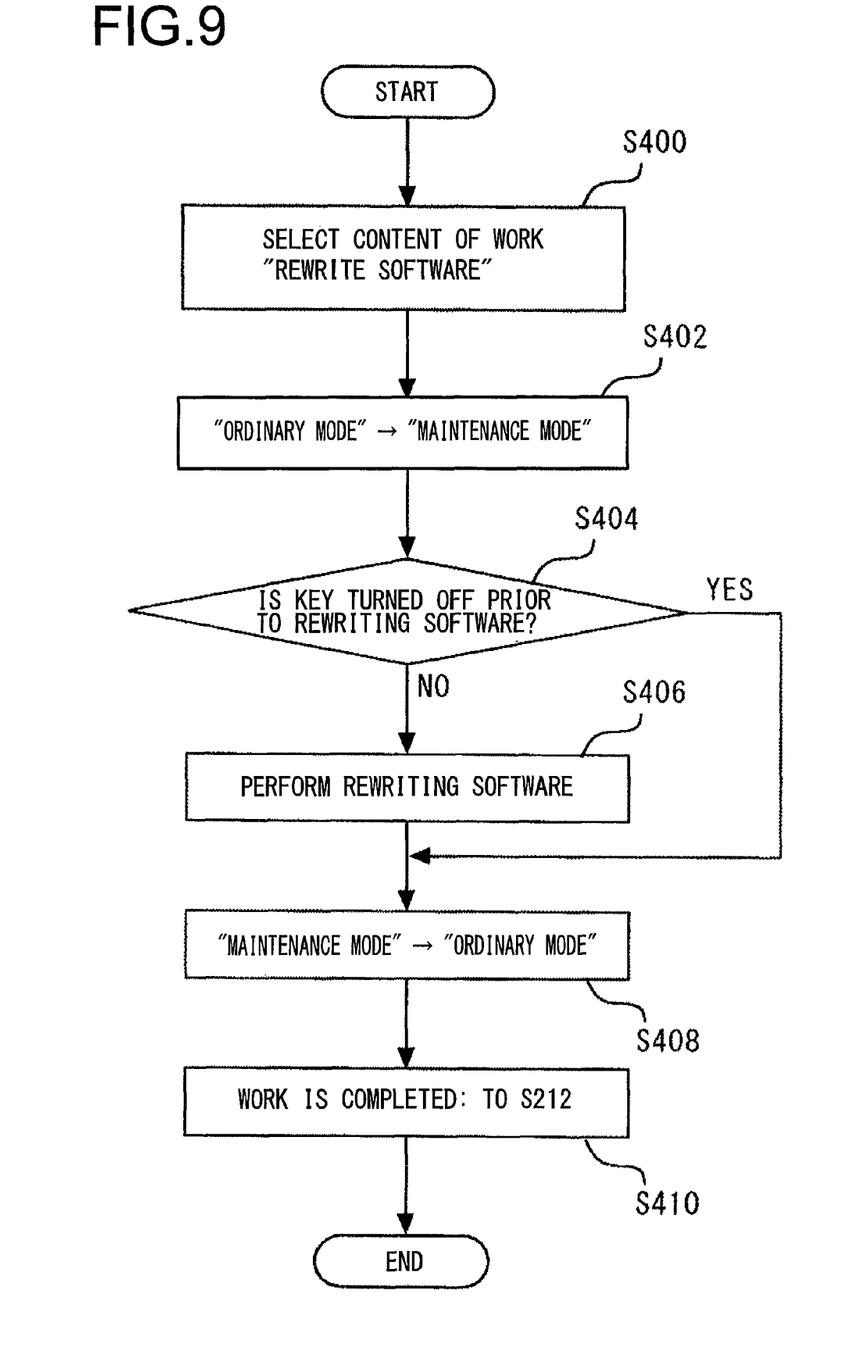
FIG. 9 is flowchart illustrating the flow of processing in case "REWRITE SOFTWARE" is selected as the content of the work.

FIG. 9 illustrates the flow of processing in case "REWRITE SOFTWARE" is selected as the content of work. The term "REWRITE SOFTWARE" as used herein refers to, for instance, rewriting (updating) the control program (software) for a subject controller to a new version of control program (software) which is provided with countermeasures for defects that occur on the market. Upon rewriting the software, communication with each controller may be lost during the rewriting the software for the subject controller. Sometimes this is determined to be a failure to generate an error code. Switching the work mode from the ordinary mode to the maintenance mode prior to the rewriting of the software enables avoiding recording unnecessary error codes and transmitting such error codes to the information center.

In case "REWRITE SOFTWARE" is selected as the content of work as shown in FIG. 9 (step S400), the work mode is automatically switched from the ordinary mode to the maintenance mode (step S402). Then, the software is rewritten by using the service tool 80. In some circumstances, while the software is being rewritten, the rewriting is disrupted, for instance, by turning the engine key off (step S404).

In case the rewriting of the software is performed without disruption of the work (step S406), the operation returns from the maintenance mode to the ordinary mode immediately after completion of the rewriting (step S408) and the work ends (step S410). In addition, in case the engine key is turned off prior to the rewriting of the software in step S404, the work mode returns immediately from the maintenance mode to the ordinary mode (step S408) to discontinue the maintenance mode.

Replace Parts

Figure 10:
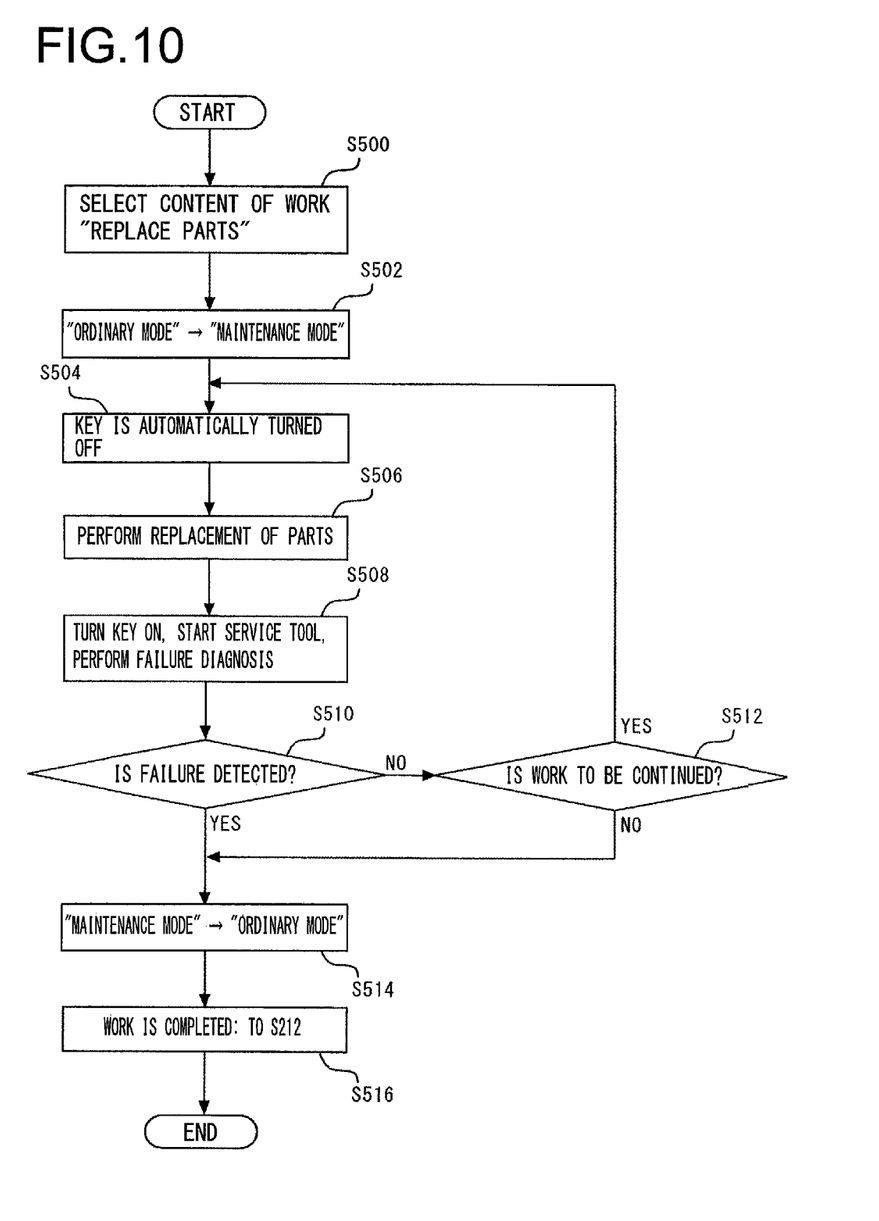
FIG. 10 is a flowchart illustrating the flow of processing in case "REPLACE PARTS" is selected as the content of the work.

FIG. 10 illustrates the flow of processing in case "REPLACE PARTS" is selected as the content of work. The term "replacement of parts" as used herein refers to, for instance, work to periodically replace filters or to work to replace each part such as a hydraulic cylinder or a hydraulic motor because of a defect. For some parts replacement work, it becomes also necessary to detach piping, signal lines, sensors that are connected to the parts depending on the part that is subjected to the parts replacement. If the detached piping, etc. is left as it is without being returned to the attached state, such a state may be determined to generate an error code. To cope with this, switching the work mode from the ordinary mode to the maintenance mode prior to the parts replacement work enables avoiding recording of an unnecessary error code and transmitting it to the information center.

As shown in FIG. 10, in case first the parts replacement is selected as the content of work (step S500), the work mode is automatically switched from the ordinary mode to the maintenance mode (step S502), the engine key of the vehicle body is automatically turned off (step S504), and the daily report information, which is being created, is temporarily recorded in the memory area in the service tool 80. The reason that the engine key is automatically turned off in step S504 is that parts replacement performed in a state in which power is supplied to the sensors or the controller may break the equipment unpredictably.

The parts replacement is performed in a state in which the engine key is turned off (step S506) and then the engine key is turned on again to activate the service tool 80 (step S508). When the service tool 80 is activated, it reads out the daily report information that is being created and performs failure diagnosis on the service tool 80. In next step S510, it determines whether a failure is detected. If it determines that no failure is detected (YES), since parts replacement is completed normally, it causes the work mode to be returned from the maintenance mode to the ordinary mode (step S514) to end the work (step S516).

On the other hand, in case it determines that a failure is detected in step S510 (NO), it allows the service person to select whether the work is to be continued on the service tool 80 (step S512). In case the service tool 80 determines that the work is continued (YES), it causes the operation to return to step S504 to repeat similar processing. On this occasion, if the cause of the failure is neglecting returning the piping, signal lines, sensors, etc., to the original positions at the time of parts replacement, such parts are duly returned to their original places and then the service tool 80 checks again whether a failure is detected in step S510.

In case the cause of failure is unknown in step S512, the service tool 80 determines that some unexpected problem occurs and causes discontinuation of the work to be selected (NO). In this case too, the service tool 80 causes the work mode to transition from the maintenance mode to the ordinary mode (step S514). It causes the current failure to be recorded at the controller and causes the corresponding error code to be transmitted to the information center. Then it causes a quick countermeasure to be taken.

The abnormality information control device 300 according to the present invention is configured to automatically switch the work mode between the ordinary mode and the maintenance mode according to the content of the maintenance work or situation. This enables avoiding outputting meaningless false abnormality information while the vehicle body is in the maintenance mode but allows outputting only true abnormality information generated in the ordinary mode. This also reliably avoids human mistakes such as erroneous switching or neglecting switching the work mode to the ordinary mode after the maintenance work. This makes it unnecessary to connect the failure diagnosis device to the vehicle body at all times upon maintenance work unlike the conventional technology or to take a countermeasure such as providing a uniform standard for error codes. Although this embodiment has been explained taking a hydraulic excavator as an example of the construction machine, the same is true for wheel loaders, dump trucks and bulldozers and so on.

REFERENCE SIGNS LIST

100 . . . hydraulic excavator (construction machine)
200 . . . hydraulic system
300 . . . maintenance device
25 . . . monitor device
30 . . . controller (abnormality detection means, abnormality information output means, mode switch means)
60 . . . information controller (abnormality detection means, abnormality information output means, mode switch means, service apparatus connection means)
61 . . . wireless communication terminal
80 . . . service tool

The invention claimed is:

1. An abnormality control device for a construction machine, comprising:
an abnormality detection unit that detects abnormality of an apparatus installed on the construction machine;
an abnormality information output unit that outputs abnormality information about the apparatus detected by the abnormality detection unit in an ordinary mode, and negates or avoids outputting the abnormality information about the apparatus detected by the abnormality detection unit in a maintenance mode;
a mode switch unit that detects a content of maintenance work and switches a work mode between an ordinary mode and a maintenance mode according to the content of work or a situation; and
a connection unit that connects a service apparatus that performs maintenance work to a vehicle body; wherein
the mode switch unit switches the work mode between the ordinary mode and the maintenance mode according to the content of maintenance work selected at the service apparatus or the situation of maintenance work selected at the service apparatus.

2. The abnormality control device for a construction machine according to claim 1, wherein:
the mode switch unit switches the work mode to the ordinary mode if the content of maintenance work or the situation selected at the service apparatus is to be performed in a state in which an engine is started up, or switches the work mode to the maintenance mode if the content of maintenance work or the situation selected at the service apparatus is to be performed in a state in which the engine is stopped.

3. The abnormality control device for a construction machine according to claim 1, wherein:
the mode switch unit switches the work mode to the ordinary mode when the maintenance work performed in the maintenance mode is completed.

4. The abnormality control device for a construction machine according to claim 1, wherein:
the mode switch unit switches the work mode to the ordinary mode when the service apparatus is disconnected.

* * * * *